Figures 1, 2:
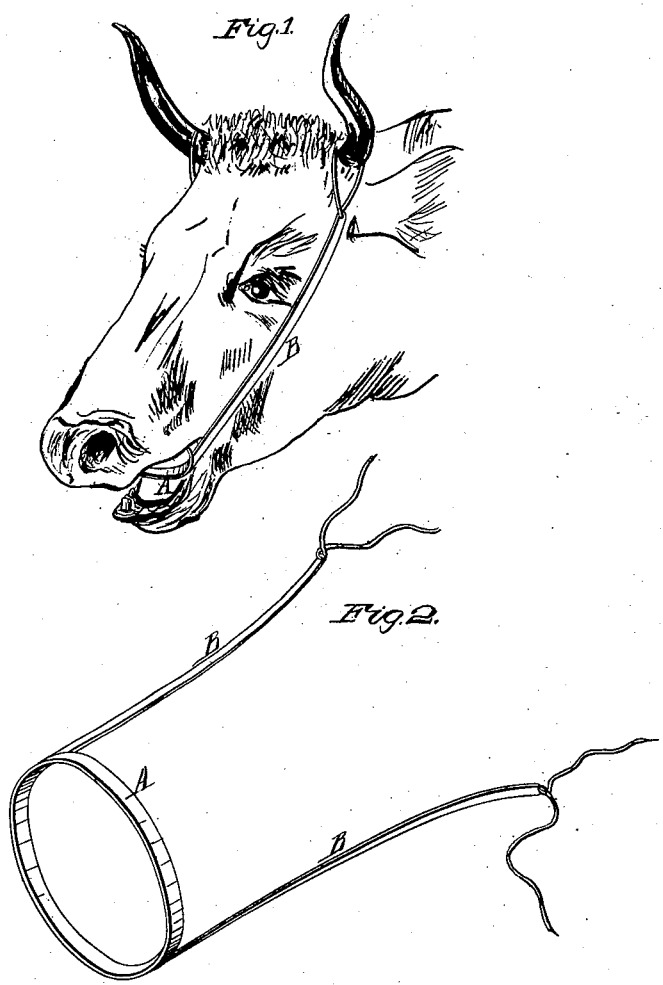

W. Kegg,
Cattle Gag.

No. 59,035. Patented Oct. 23, 1866.

Witnesses:

Inventor:
Wm Kegg

UNITED STATES PATENT OFFICE.

WILLIAM KEGG, OF LASSELLSVILLE, NEW YORK.

IMPROVEMENT IN CATTLE-GAGS.

Specification forming part of Letters Patent No. 59,035, dated October 23, 1866.

*To all whom it may concern:*

Be it known that I, WILLIAM KEGG, of Lassellsville, in the county of Fulton and State of New York, have invented a new and Improved Cattle Gag; and I do hereby declare that the following is a full, clear, and exact description thereof, which will enable others skilled in the art to make and use the same, reference being had to the accompanying drawings, forming part of this specification, in which—

Figure 1 is a view of my invention as applied to use. Fig. 2 is a perspective view of the same.

Similar letters of reference indicate like parts.

My invention is designed for holding open the mouth of an animal for removing from its throat anything which may be choking the animal.

My invention consists of a ring having two arms so connected to it that when the ring is placed in the mouth of the animal for keeping the lower jaw wide open they will extend up along the outside of the cheeks of the animal, and be susceptible of being fastened to its horns, whereby all danger of the animal closing its mouth whenever the hand is thrust in is obviated.

A designates a ring, of metal, which is of a size to allow of the hand in a contracted state being thrust through it. B B are two arms connected to opposite sides of the ring, and of a suitable length to permit of their ends being tied or attached temporarily to the horns of the animal.

When using the gag the ring A is to be inserted in the mouth of the animal, as shown in Fig. 1, and the arms B B secured to the horns.

This device is handy and convenient, and by its use all danger of the animal closing its mouth and crushing or injuring the hand is entirely obviated, and the thrusting of the hand through the ring and removing the obstacle from the throat of the animal is an easy matter, and can be quickly performed.

What I claim as new, and desire to secure by Letters Patent, is—

A cattle-gag consisting of a ring, A, and arms B B, constructed and applied substantially as and for the purpose specified.

WILLIAM KEGG.

Witnesses:
    FRANK E. REED,
    L. DEMPSTER.